May 8, 1962  C. NOVAK ETAL  3,032,968
ENGINE EXHAUST GAS PURIFIER
Filed Jan. 11, 1960  3 Sheets-Sheet 2

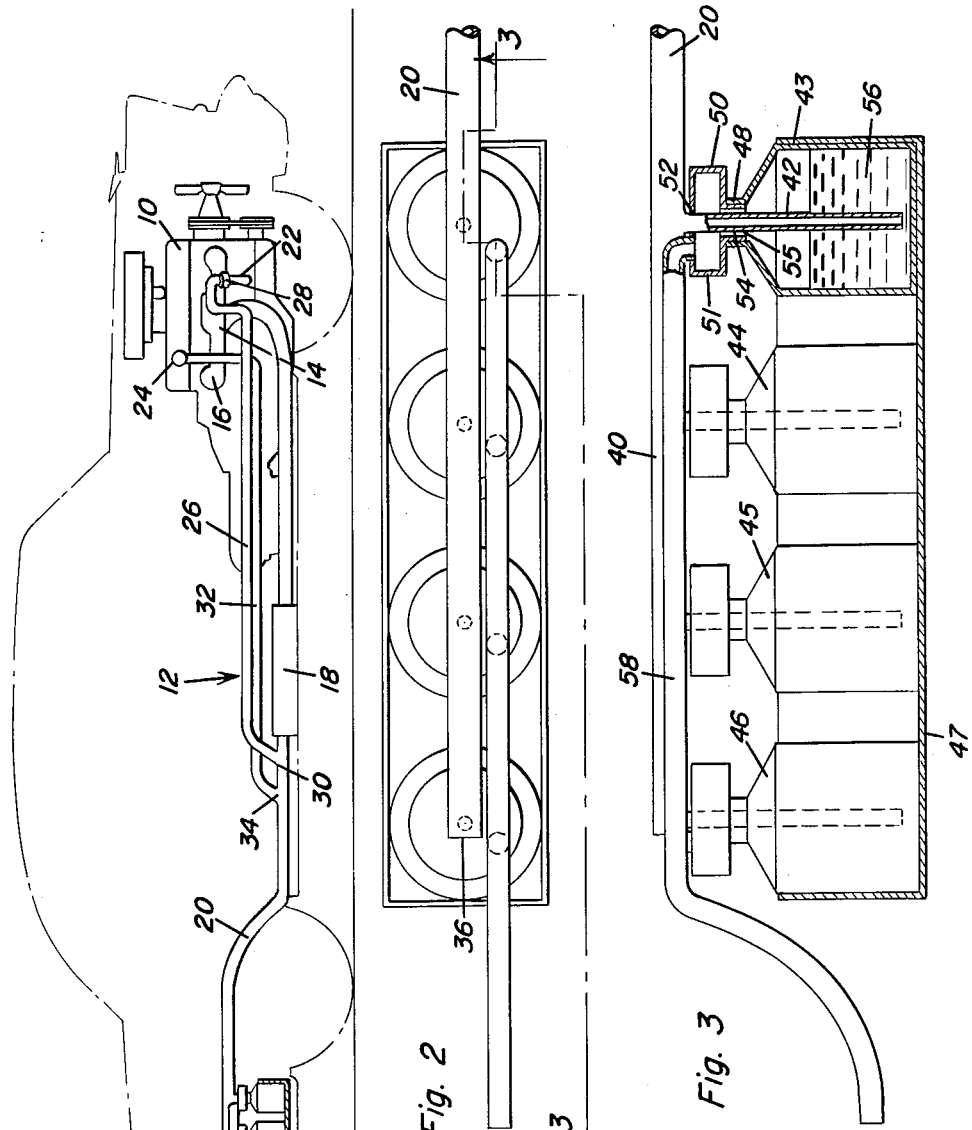

Charles Novak
Jim A. Meadows
John P. Origer, Jr.
Joseph K. Robideaux
INVENTORS

BY Clarence A. O'Brien
and Harvey B. Jacobson
Attorneys

May 8, 1962 C. NOVAK ETAL 3,032,968
ENGINE EXHAUST GAS PURIFIER
Filed Jan. 11, 1960 3 Sheets-Sheet 3
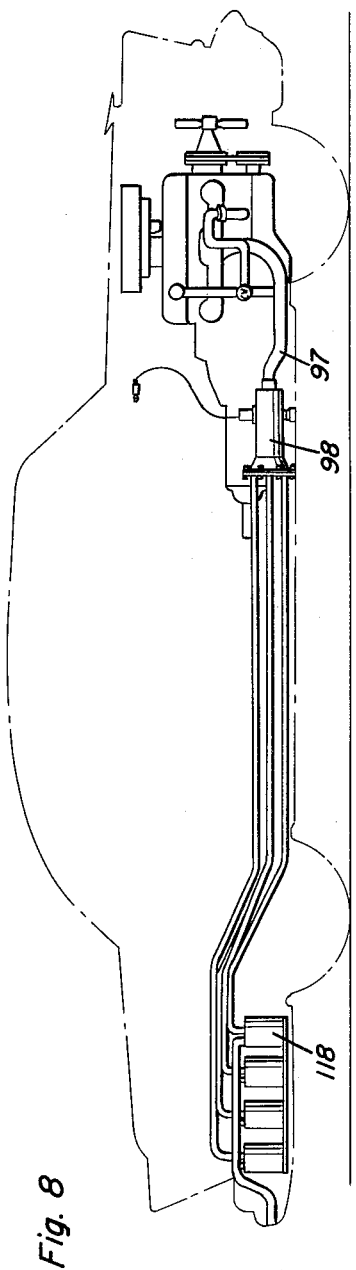
Fig. 8
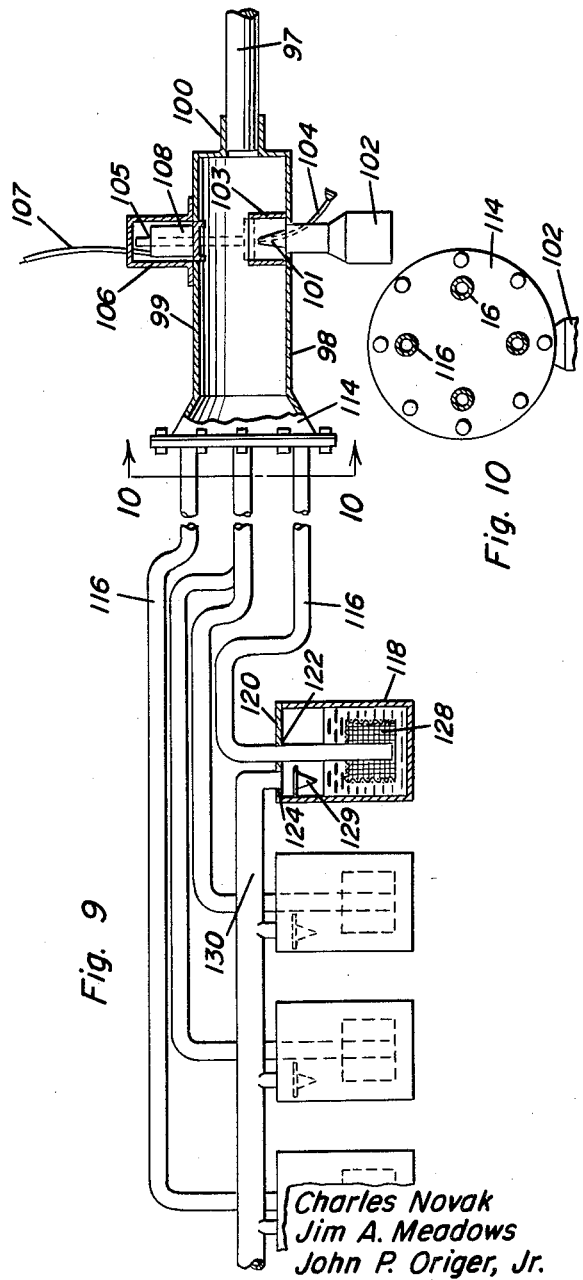
Fig. 9
Fig. 10
Charles Novak
Jim A. Meadows
John P. Origer, Jr.
Joseph K. Robideaux
INVENTORS
BY Clarence A. O'Brien
and Harvey B. Jacobson
Attorneys United States Patent Office 3,032,968
Patented May 8, 1962

3,032,968
ENGINE EXHAUST GAS PURIFIER
Charles Novak, 13705 Pierce St., Pacoima, Calif.; Jim A. Meadows, 15901 Mayall St., Sepulveda, Calif.; John P. Origer, Jr., 252 S. New Hampshire, Los Angeles, Calif.; and Joseph K. Robideaux, 13705 Pierce St., Pacoima, Calif.
Filed Jan. 11, 1960, Ser. No. 1,765
5 Claims. (Cl. 60—30)

This invention relates to motor vehicle attachments or accessories and more particularly to devices for overcoming or very materially reducing the smog problem now prevalent in the western part of this country.

An object of the invention is to provide devices for separating harmful gases from the other products of combustion of motor vehicle engines prior to discharging the gases to the atmosphere. Unburned hydrocarbons and nitrogen oxides are in copious quantities in the exhaust gases of motor vehicles, i.e., trucks, automobiles, buses, etc. These are capable of being removed from the other products of combustion and fumes from the crankcase of the motor vehicles, thereby leaving gases which, although harmful, are considerably purer and do not add materially to the smog production as much as the products of combustion and fumes, ordinarily from the crankcase, which are removed by the vehicle exhaust purifier in accordance with the invention.

The principles of the invention are capable of being embodied in numerous forms. In the majority of the forms of the invention there is utilized a liquid filtration procedure wherein the exhaust gases must pass through a wash of liqiud containing baking soda or an equivalent substance to separate the unwanted nitrogen and unburned or incompletely burned carbonaceous gases.

It is quite well known that the exhaust gases from an internal combustion engine of the type used in vehicles, are frequently combustible, and therefore in certain embodiments of the invention this factor is taken into consideration, and the gases are first ignited before being subjected to an aqueous bath for the further separation of gases, gas laden substances, and for chemical purification obtained by the baking soda in the liquid purification bath.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an engine-transmission power plant of a motor vehicle, this view showing the exhaust system which has been modified to the inclusion of one purifier of the invention.

FIGURE 2 is a top view of the liquid purification stage of the purifier.

FIGURE 3 is a vertical sectional view taken approximately on the plane indicated by the broken section line 3—3 of FIGURE 2.

FIGURE 8 is a side elevational view of another motor vehicle power plant showing a further form of the invention incorporated therewith.

FIGURE 9 is a partially elevational and partially sectional view showing details of construction of the purifier in FIGURE 8.

FIGURE 10 is a transverse vertical sectional view taken on the line 10—10 of FIGURE 9.

Figure 7:
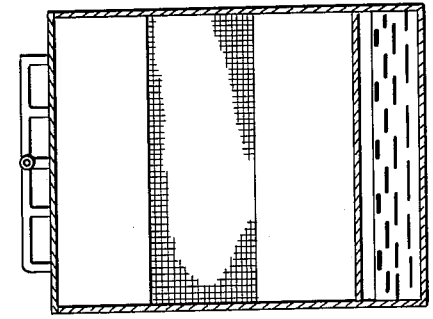
FIGURE 7 is a transverse vertical sectional view taken on the line 7—7 of FIGURE 5.

In the accompanying drawings reference is first made to FIGURES 1–3. A conventional engine 10 is shown with a part of the drive line for the motor vehicle. The exhaust gas purifier 12 is shown in conjunction with the exhaust system 14 of engine 10, the latter including an exhaust manifold 16, a muffler 18 and an exhaust pipe 20 in which muffler 18 is interposed. The engine has a crankcase breather 22 and a valve chamber discharge pipe 24.

Conduit 26 is equipped with a bell cup 28 fitting over the crankcase breather 22, and the conduit is connected as at 30 to the exhaust pipe 20 on the downstream side of muffler 18 whereby fumes from the breather 28 are drawn into pipe 20 to become admixed with the products of combustion and to be carried with them through pipe 20. Conduit 32 is attached to the valve chamber discharge pipe 24, for instance, by another bell cap or by some other type of connection, and it, too, is joined to exhaust pipe 20, as at 34, on the downstream side of muffler 18.

Exhaust pipe 20 (FIGURES 2 and 3) has an end wall 36 for closing or capping the rear end thereof. Further, it has a manifold 40 either formed therewith or attached thereto, the manifold being made of a number of ports, each of which has a tube, for instance, tube 42 (FIGURE 3) connected thereto. The individual tubes extend downwardly into receptacles 43, 44, 45 and 46 which are each carried by a receptacle rack 47 mounted at the back part of the motor vehicle.

Typical receptacle 43 has a neck 48 and a special cap 50 attached to the neck. The special cap is in the form of a casing 51 having an inlet opening 52 through which tube 42 extends. The tube terminates adjacent to the bottom of receptacle 43. A space 54 is left between the side wall tube 42 and the inner surface of neck 55 which fits into neck 48 so that the gases discharged from tube 42 may pass upwardly, after bubbling through liquid 56 in receptacle 43, through casing 51. Thereafter it flows through conduit 58 to which casing 51 is connected. Each of the receptacles has a casing identical to case 51 connected thereto so that the action of the gas passing through exhaust pipe 20, into the receptacle and passing from the receptacle through the caps and into pipe or conduit 58 is the same. The outer extremity of conduit 58 is open and functions as the means for carrying off the purified exhaust gases of the motor vehicle power plant. It is preferred that the liquid 56 be water plus an additive to chemically extract some of the unwanted products in the gas. For instance, baking soda may be used, although it is quite evident that the type of additive in the water may be varied in accordance with effectiveness and cost requirements.

Figure 6:
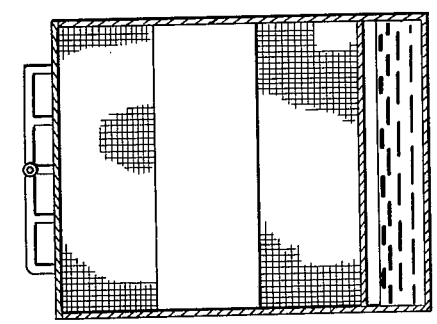
FIGURE 6 is a transverse vertical sectional view taken approximately on the line 6—6 of FIGURE 5.
Figure 4:
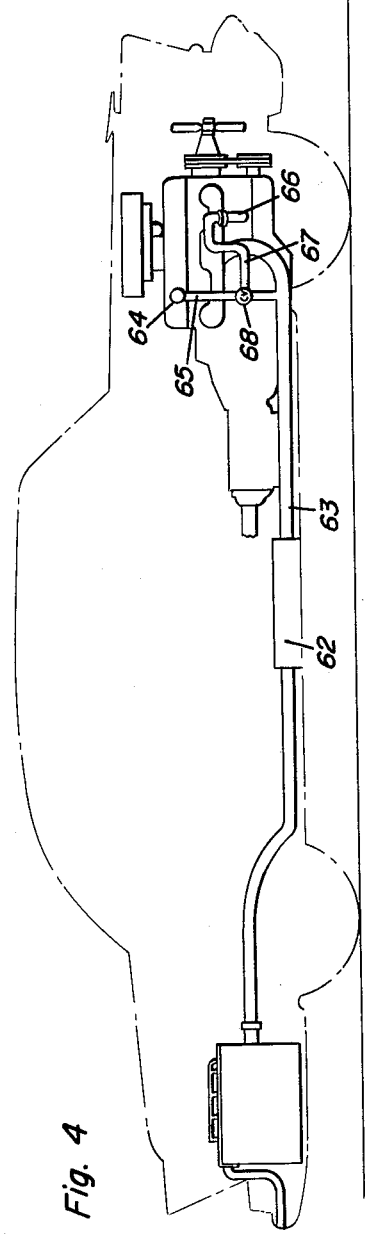
FIGURE 4 is a side elevational view showing a modification of the purifier.
Figure 5:
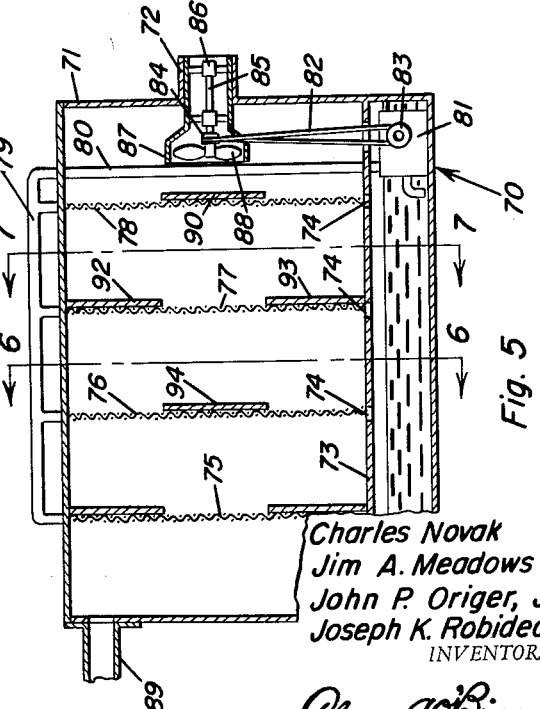
FIGURE 5 is a vertical sectional view of the liquid filter section of the purifier.

Reference is now made to FIGURES 4–6. A slightly different arrangement is disclosed. Inasmuch as the power plant shown in FIGURE 4 is identical to the power plant shown in FIGURE 1, a detailed discussion thereof is not given. Muffler 62 is conventional and has exhaust gases fed from the exhaust manifold by way of exhaust pipe 63, the latter having muffler 62 interposed therein between its ends. The valve chamber breather 64 is connected to conduit 65 and the crankcase breather 66 is connected to conduit 67. The conduits 65 and 67 may have any type of end connection for engagement with breathers 64 and 66, for instance, bell ends, clamps, etc. The conduits 65 and 67 are joined together by way of a check valve 68 which prevents back-flow of exhaust gases from exhaust pipe 63 into the breathers 64 and 66, this being desirable since both conduits 65 and 67 are connected to exhaust pipe 63 on the upstream side of the muffler 62.

By attaching the conduits 65 and 67 to the exhaust pipe 63 on the upstream side of muffler 62, the fumes and gases from breathers 64 and 66 commingle while the exhaust gases are still very hot to promulgate burning of the gases being discharged from breathers 64 and 66.

After the gases pass through muffler 62, they enter a liquid filter assembly 70 which functions somewhat along the lines of the liquid filter assembly shown in FIGURES 2 and 3, at least to the extent of passing through a liquid wash, and the liquid is the same as liquid 56. The liquid filter assembly 70 is made of a housing 71 having an inlet neck 72 to which exhaust pipe 63 is connected. Horizontal partition 73 is in the housing 71 and has a number of apertures 74 therein at the bottom of vertical screens 75, 76, 77 and 78. The apertures 74 provide for the return of liquid which is fed through the tops of the screens 75, 76, 77 and 78 by means of liquid manifold 79. The liquid manifold is in the form of a pipe having ports connected through openings in the top wall of housing 71 in order to feed liquid to the top edges of the screens 75, 76, 77 and 78 along the length thereof. A liquid feed conduit 80 is connected to manifold 79 and extends to a sump pump 81 disposed in casing 71 beneath horizontal partition 73.

The sump pump may be driven by any suitable means, such as an electric motor. However, it is within the contemplation of the invention to drive sump pump 81 by a belt 82 entrained over a pulley 83 attached to the sump pump and also entrained over a pulley 84 on propeller shaft 85. The propeller shaft is mounted in bearings 86 carried by bearing brackets in neck 72, and the neck terminates within casing 71 in a propeller cowl 87 containing propeller 88. As the rush of exhaust gases passes through neck 72, the gases impinge on propeller 88 causing it to turn and thereby operate the sump pump 81. This continually pumps and recirculates liquid from the bottom of casing 71 through manifold 79 and down screens 75, 76, 77 and 78.

The exhaust gases are required to take a devious path of travel from the inlet end of casing 71 to the discharge tube 89 at the upper rear part of the casing 71. To obtain the desired devious path of travel so as to expose the gases to a large area of wash, there is a transverse baffle 90, in the form of a plate, attached to the sides of housing or casing 71 and in axial alignment with shaft 85. The upper and lower sections of screen 78 are unblocked, however the center section is blocked by baffle 90. The next screen 77 has a pair of spaced baffles 92 and 93 mounted in the housing and located above and below respectively of the baffle 90, leaving only the center section of screen 77 exposed. Screen 76, which is the next screen, has a single baffle 94 at the center thereof similar to screen and baffle 78 and 90 respectively, while the final screen 75 has a baffle arrangement similar to the screen 77.

Reference is now made to FIGURES 8-10. In this form of the invention, the power plant of the motor vehicle is the same as the previously described power plants. In fact, the connection between exhaust pipe 97 and the engine is identical to the connection between exhaust pipe 63 and the engine as shown in FIGURE 4. However, FIGURE 8 discloses a burner 98 in place of a muffler. This burner will also function as a muffler, but its principal function is to act as an after burner for the engine of the motor vehicle. The after burner is made of a casing 99 having an inlet 100 connected with exhaust pipe 97. A gaseous burner 101, i.e., a burner in the nature of a Bunsen burner, has a small fuel tank 102 connected therewith, for example, a kerosene tank. A flame shield 103 which may be in the form of an open-ended cylinder, is secured within the burner 98 and has the tip of burner 101 contained therein to prevent flame-out. Ignition of burner 101, which may be achieved electrically by an electrical igniter 104, causes secondary burning or combustion in burner 98, and the principal fuels are the exhaust gases from the engine which are conducted by exhaust pipe 97. When the motor vehicle engine is not in operation, the burner 101 should be extinguished and therefore there is a solenoid 105 disposed in a protective housing 106 attached to the burner casing 99. The solenoid is connected by wire 107 to the ignition switch of the motor vehicle so that the solenoid becomes energized as soon as the ignition switch is closed. Energization of the solenoid 105 causes the cover 108 to be lifted thereby exposing the tip of burner 101. When the ignition switch is closed, the solenoid is deenergized thereby causing the tip cover 108 to be gravity-lowered or spring-pressed to a lowered position which is nested within flame guard 103 and in a covering position with reference to the tip of burner 101. This smothers the flame emanating from the tip of burner 101.

The gases from burner 98 flow through a bell manifold 114 which is attached to the rear end of the housing 99. A plurality of tubes 116 are attached to the bell manifold 114 and each terminates near the lower end of a receptacle 118. Since all of the tubes 116 and receptacles 118 are identical, only one is shown in detail. It is made of a receptacle having side walls, bottom wall and a top wall 120 provided with two openings 122 and 124. Opening 122 has conduit 116 extending therethrough and there is a filter screen 128 surrounding the lower end of the conduit 116 which is submerged in a liquid similar to the previously described liquid. Splash guard 129 is attached to the side wall of the receptacle and is in vertical alignment with opening 124 which is the discharge opening. The discharge opening 124 has a portion of manifold 130 in registry therewith, and this manifold picks up the exhaust gases from the four illustrated receptacles, and discharges the gases to the atmosphere after first having been subjected to after burning processes and second, subjected to clarifying and liquid wash as well as chemical filtration.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an automotive vehicle internal combustion engine having an exhaust pipe for discharging exhaust gases from the engine and a tail pipe opening to the atmosphere, an exhaust gas purifier comprising an elongated combustion chamber, inlet means at one end of said chamber connected to said exhaust pipe for delivering exhaust gases into said chamber, a plurality of conduits connecting the other end of said chamber to said tail pipe at the downstream side of said chamber, said inlet means and said conduits communicating with said chamber in alignment at opposite ends of said chamber for straight line flow of exhaust gases therethrough, a fuel burner disposed in said chamber through one side thereof and between said opposite ends and projecting a flame into said chamber transversely of said straight line of flow, means for supplying fuel to said burner and means for igniting fuel discharged by said burner, a cylindrical flame shield surrounding said burner and having one end secured to the chamber wall with its other end open, flame extinguishing means mounted in the other wall of the chamber in alignment with said flame shield and movable into engagement with the latter for extinguishing the flame therefrom and operating means connected to said extinguishing means for selectively withdrawing the latter from said shield.

2. The combination of claim 1 wherein said operating means comprises a solenoid.

3. The combination of claim 2 wherein said solenoid is connected to the electrical ignition system of the engine for energization of the solenoid when the electrical ignition system is operative.

4. The combination of claim 1 including a plurality of receptacles containing a liquid agent for chemical filtration of exhaust gases, each of said conduits having its exit submerged in the liquid agent of a receptacle, outlet means for each of said receptacles connected to said tail pipe on the downstream side of said chamber.

5. The combination of claim 4 including screens submerged in the liquid agent in each receptacle and surrounding the conduit exit therein.

References Cited in the file of this patent
UNITED STATES PATENTS

| | | |
|---|---|---|
| 1,724,132 | Hart | Aug. 13, 1929 |
| 1,839,880 | Hyatt | Jan. 5, 1932 |
| 1,843,999 | White | Feb. 9, 1932 |
| 1,875,024 | Kryzanowsky | Aug. 30, 1932 |
| 2,203,554 | Uhri et al. | June 4, 1940 |
| 2,488,563 | Sills | Nov. 22, 1949 |
| 2,612,745 | Vecchio | Oct. 7, 1952 |
| 2,702,452 | Taylor | Feb. 22, 1955 |
| 2,862,354 | Barnhart | Dec. 2, 1958 |